United States Patent [19]

Guerreri

[11] Patent Number: 5,189,727
[45] Date of Patent: Feb. 23, 1993

[54] METHOD AND APPARATUS FOR LANGUAGE AND SPEAKER RECOGNITION

[75] Inventor: Stephen J. Guerreri, Cary, N.C.

[73] Assignees: Electronic Warfare Associates, Inc.; Systems Technology Associates, Vienna, Va.

[21] Appl. No.: 752,898

[22] Filed: Aug. 26, 1991

Related U.S. Application Data

[63] Continuation of Ser. No. 386,425, Jul. 28, 1989, abandoned.

[51] Int. Cl.$^5$ .............................................. G10L 9/06
[52] U.S. Cl. ........................................ 395/2; 381/42
[58] Field of Search .................... 395/2; 381/41–43; 364/602, 604

[56] References Cited

U.S. PATENT DOCUMENTS

| | | | |
|---|---|---|---|
| 4,084,245 | 4/1978 | Bunge | 381/42 |
| 4,624,010 | 11/1986 | Takebayashi | 381/41 |
| 4,720,863 | 1/1988 | Li et al. | 381/42 |
| 4,752,957 | 6/1988 | Maeda | 381/42 |
| 4,827,519 | 5/1989 | Fujimoto et al. | 381/42 |
| 4,837,830 | 6/1989 | Wrench, Jr. et al. | 381/42 |

Primary Examiner—Michael R. Fleming
Assistant Examiner—David D. Knepper
Attorney, Agent, or Firm—Cushman, Darby & Cushman

[57] ABSTRACT

An initial learning phase creates histograms for each of the languages to be recognized. A first pass enters a number of samples of speech, and at each predetermined instant of time, each sample of speech is Fast Fourier Transformed (FFT) to create a spectrum showing frequency content of the speech at that instant of time (a spectral vector). The frequency content is compared with frequency contents which have been previously stored. If the current spectral vector is close enough to a previously stored spectral vector, a weighted average between the two is formed, and a weight indicating frequency of occurrence is incremented. If the current value is not similar to one which has been previously stored, it is stored with an initial weight of "1". The most common frequency spectra are determined for all of the languages grouped together to form a composite basis set. A second pass then puts a sample of sounds through the Fast Fourier Transform to again obtain frequency spectrums. The obtained frequency spectrums are compared against all of the prestored frequency spectra in the composite basis set, and a closest match is determined. A number of occurrences of each frequency spectra in the composite basis set is plotted as a histogram. This histogram is used during the recognition phase to determine a closest fit between an unknown language and one of the known languages.

52 Claims, 8 Drawing Sheets

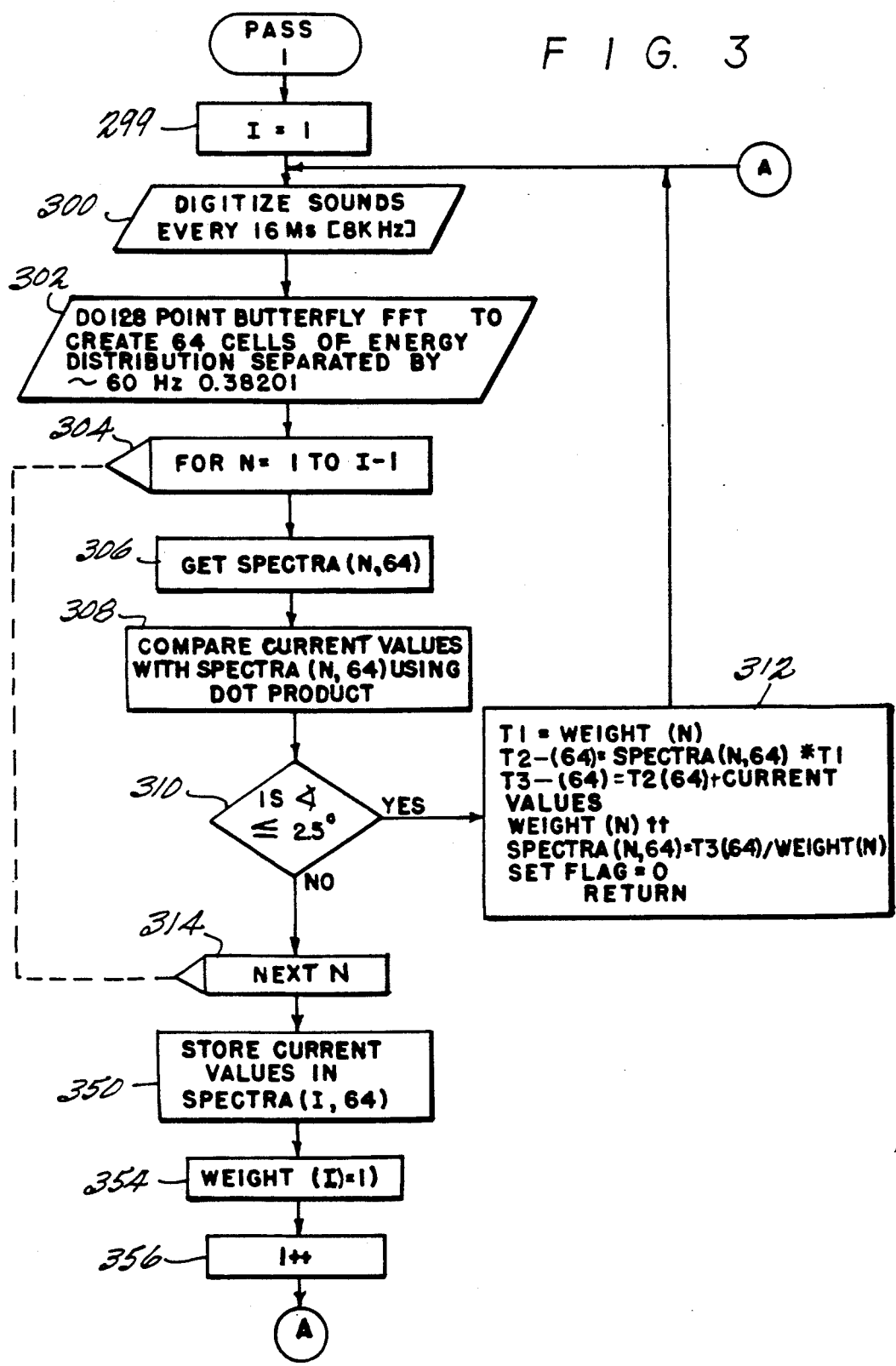

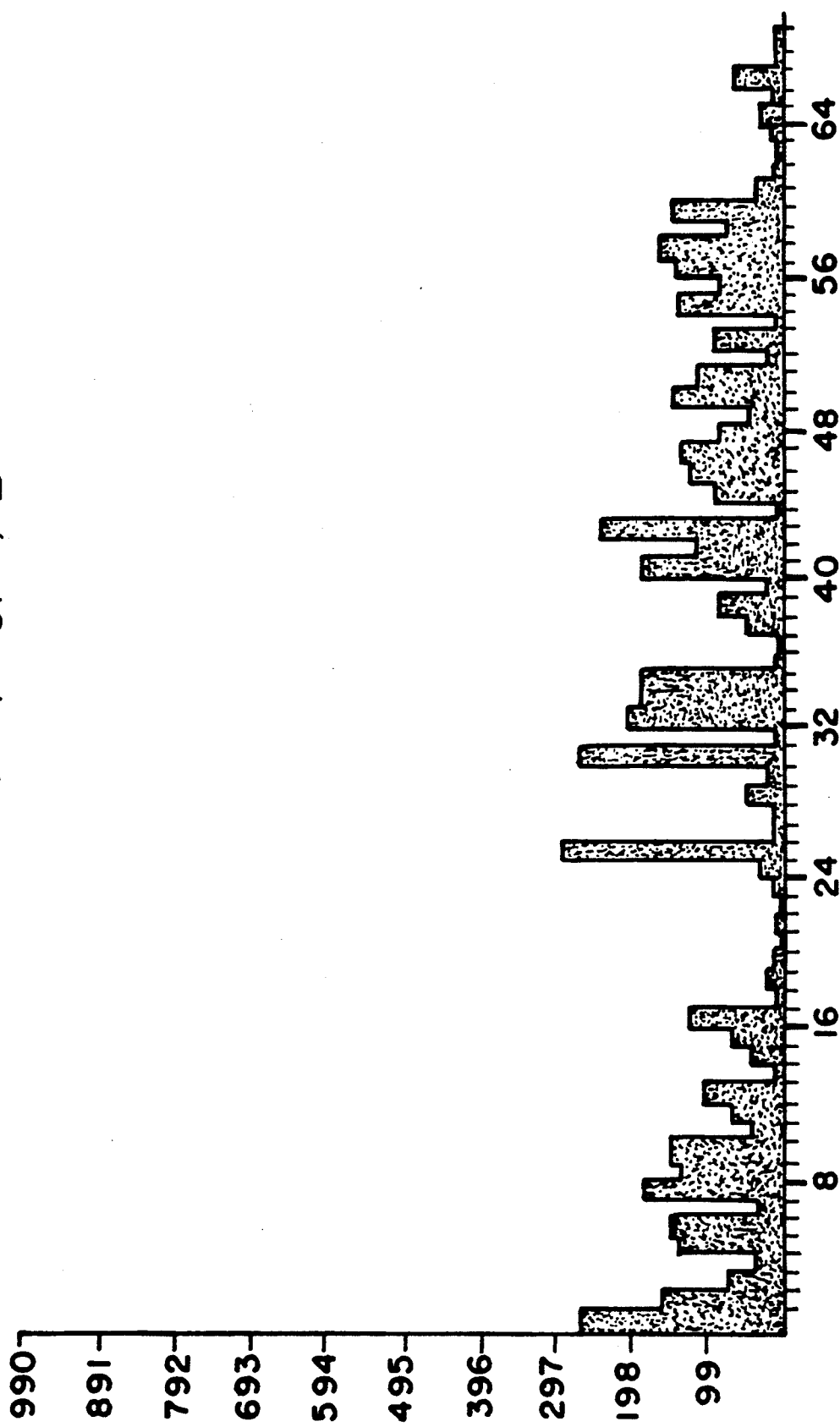

METHOD AND APPARATUS FOR LANGUAGE AND SPEAKER RECOGNITION

This is a continuation of application Ser. No. 07/386,425, filed on July 28, 1989, now abandoned.

FIELD OF THE INVENTION

The present invention defines a method and apparatus for recognizing aspects of sound. More specifically, the invention allows recognition by prestoring a histogram of occurrences of spectral vectors of all the aspects and building an occurrence table of these spectral vectors for each known aspect. Pattern recognition is used to recognize the closest match to this occurrence table to recognize the aspect.

BACKGROUND OF THE INVENTION

There are many applications where it is desirable to determine an aspect of spoken sounds. This aspect may include identifying a language being spoken, identifying a particular speaker, identifying a device, such as a helicopter or airplane and a type of the device, and identifying a radar signature, for instance. For instance, a user may have a tape recording of information, which the user needs to understand. If this information is in a foreign language, it may be required to be translated. However, without knowing what language the information is in, it will be difficult for the user to choose a proper translator.

Similarly, it may be useful, when processing tape recordings, to determine who is the speaker at any particular time. This will be especially useful in making transcripts of a recorded conversation, when it may be difficult to determine who is speaking and at what time.

It is well known that all language is made up of certain phonetic sounds. The English language, for example, has thirty-eight phonetic sounds that make up every single word. In average English continuous speech, there are approximately ten phonetic sounds which are uttered every second. Other languages are composed of other phonetic sounds.

Prior techniques for recognizing languages have attempted to identify a number of these phonetic sounds. When a determined number of phonetic sounds are identified, a match to the particular language which has these phonetic sounds is established. However, this technique takes a long time to determine the proper language, and may allow errors in the language determination.

The inventor of the present invention has recognized that one reason for this is certain phonetic sounds are found in more than one language. Therefore, it would take a very long time to recognize any particular language, as many of the phonetic sounds, some of which are infrequently uttered, will have to be recognized before a positive language match can be determined.

The present invention makes use of this property of languages in a new way which is independent of the actual phonetic sounds which are being uttered.

SUMMARY OF THE INVENTION

The present invention obviates all these problems which have existed in the prior art by providing a new technique for recognizing aspects of sound. According to the present invention, these aspects can include identifying a language being spoken, identifying a particular speaker, a device, a radar signature, or any other aspect. Identifying the language being spoken will be used herein as an example. One aspect of the invention creates energy distribution diagrams for known speech. In the preferred embodiment, this is done by using an initial learning phase, during which histograms for each of the languages to be recognized are formed. This learning phase uses a two pass process.

The preferred embodiment uses a two pass learning technique described below. A first pass enters a number of samples of speech, and each of these samples of speech are continually processed. At each predetermined instant of time, each sample of speech is Fast Fourier Transformed (FFT) to create a spectrum showing frequency content of the speech at that instant of time (a spectral vector). This frequency content represents a sound at a particular instant. The frequency content is compared with frequency contents which have been stored. If the current spectral vector is close enough to a previously stored spectral vector, a weighted average between the two is formed, and a weight indicating frequency of occurrence is incremented. If the current value is not similar to one which has been previously stored, it is stored with an initial weight of "1".

The end result of this first pass is a plurality of frequency spectrums for the language, for each of a plurality of instants of time, and numbers of occurrences of each of these frequency spectrum. The most common frequency spectrum, as determined from those with a highest number of occurrences, are determined for each language to form a basis set for the language. Each of these frequency spectrum for each of the languages are grouped together to form a composite basis set. This composite basis set therefore includes the most commonly occurring frequency spectrum for each of the many languages which can be recognized.

A second pass then puts a sample of sounds, which may be the same sounds or different sounds than the previously obtained sounds, through the Fast Fourier Transform to again obtain frequency spectrums. The obtained frequency spectrums are compared against all of the pre-stored frequency spectra in the composite basis set, and a closest match is determined. A number of occurrences of each frequency spectra in the composite basis set is maintained.

For each known language sent through the second pass, therefore, a number of occurrences of each of the frequency spectra for each of the languages is obtained. This information is used to form a histogram between the various spectra of the composite basis set and the number of occurrences of each of the frequency spectrum.

This histogram is used during the recognition phase to determine a closest fit between an unknown language which is currently being spoken and one of the known languages which has been represented in terms of histograms during the learning phase. The unknown 'language is Fast Fourier Transformed at the instants of time as in the learning phase to form frequency spectrum information which is compared against the composite basis set used in the second pass of the learning phase. A histogram is formed from the number of occurrences of each element of the composite basis set. This histogram of the unknown language is compared against all of the histograms for all of the known languages, and a closest fit is determined.

By using inter-language dependency in forming the known histograms and the unknown histogram, the possibility of error and the speed of convergence of a proper result is maximized. The inter-language dependencies come from the composite basis set including the most common spectrum distributions from each of the languages to be determined and not just from the one particular language. In addition, the use of spectral distributions at predetermined instants of time ensure that all phonetic sounds, and not just those which are the easiest to recognized using machine recognition, enter into the recognition process.

BRIEF DESCRIPTION OF THE DRAWINGS

These and other objects will now be described in detail with reference to the accompanying drawings, in which:

FIG. 3 shows a flowchart used by the first pass of the learning of the present invention, in which the composite basis vector set is formed;

FIG. 7A-7C show representative histograms for English, Russian, and Chinese.

DESCRIPTION OF THE PREFERRED EMBODIMENT

A preferred embodiment of the invention will now be described in detail with reference to the accompanying drawings.

Figure 1:
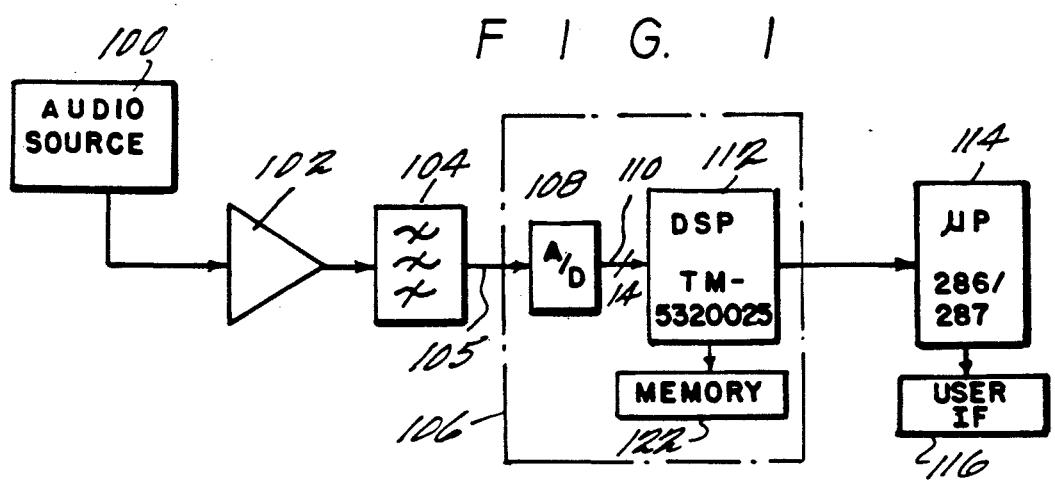
FIG. 1 shows a block diagram of the hardware used according to the present invention.

FIG. 1 shows an overview of the hardware configuration of the recognition system of the present invention. The initial data comes from an audio source 100 which can be a tape recorder, a radio, a radar device, a microphone or any other source of sound. The information is first amplified by amplifier 102, and then is band pass filtered by band pass filter 104. Band pass filter 104 limits the pass band of the filter to telephone bandwidths, approximately 90 Hz to 3800 Hz. This is necessary to prevent the so-called aliasing or frequency folding in the sampling process. It would be understood by those of skill in the art that the aliasing filter may not be necessary for other than speech applications. The band pass filtered signal 105 is coupled to first processor 106. First processor 106 includes an A-D converter 108 which digitizes the band pass filtered sounds 105 at 8 kHz to produce a 14 bit signal 110. The digitized signal 110 is coupled to a digital signal processor 112 which processes the language recognition according to the invention as will be described later with reference to the flowcharts.

User interface is accomplished using a 82286-82287 microprocessor pair which is coupled to a user interface 116.

The actual operation of the present invention is controlled by the signal processor 112, which in this embodiment is a TI TMS320C25. The code for the C25 in this embodiment was written in TI assembler language and assembled using a TI XASM25 assembler. This code will be described in detail herein.

The first embodiment of the invention recognizes a language which is being spoken, from among a plurality of languages. The language recognition system of the present invention typically operates using pre-stored language recognition information. The general operation of the system is shown by the flowcharts of FIG. 2.

Figures 2A, 2B:
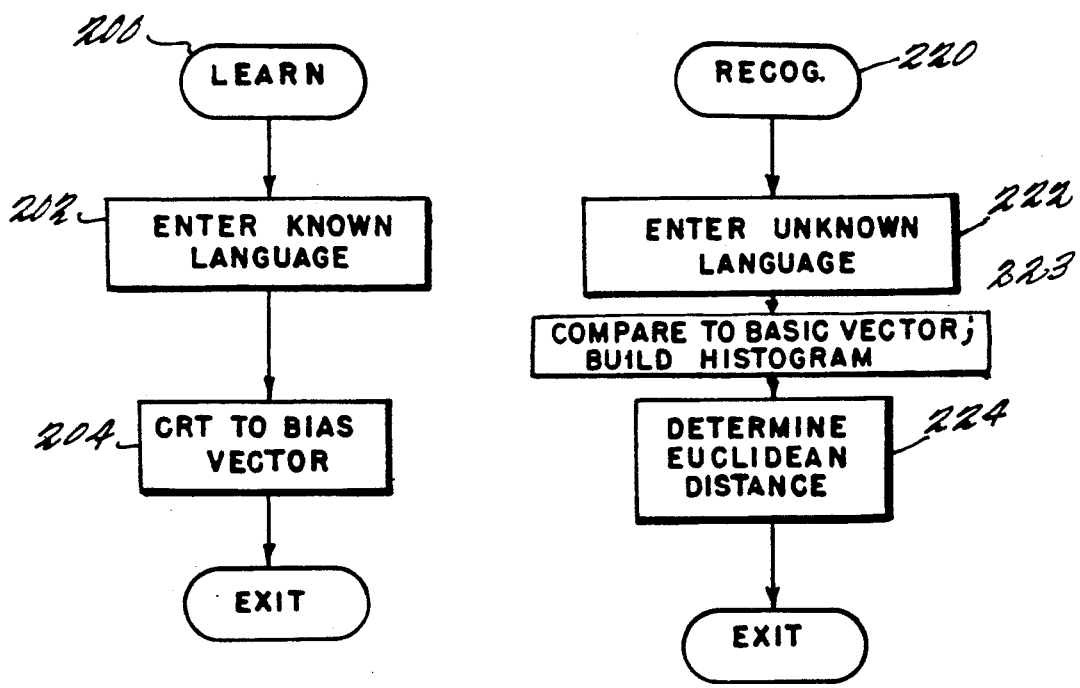
FIGS. 2A and 2B respectively show summary flowcharts of the learning and recognition phases of the present invention.

FIG. 2A begins at step 200 with a learning mode which is done off line. In the learning mode, a known language is entered at step 202. This known language is converted into basis vectors or a set of representative sounds at step 204. The basis vectors are combined into a composite basis vector, and a histogram of occurances of the elements of the composite basis vector is created at step 206.

FIG. 2B shows the recognition mode which is the mode normally operating in digital signal processor 112. FIG. 2B begins with step 220, in which the unknown language is entered at step 222. At step 223, the unknown language is compared with the basis vector to build a histogram. Euclidean distance to each of the basis vectors in the composite basis vector is determined at step 224 to recognize a language.

This summary will be elucidated throughout this specification.

The learning mode, summarized shown in FIG. 2A, is a mode in which the reference basis vectors and histograms, used to recognize the spoken language, is created. Once these vectors are created, they are user-transparent, and are stored in memory 122. Depending on the amount of memory available, many different basis vectors may be created and stored. For instance, different basis vectors can be created for all known languages, as well as all known dialects of all known languages. Alternately, only the most common ones may be created, if desired. The technique used to create the basis vectors will now be described in detail. This technique uses a two pass system of learning. In summary, the first pass determines all possible spectral contents of all languages, and the second pass determines the occurrences of each of these spectral contents.

FIG. 3 shows the first pass of the learning mode of the present invention.

The learning mode exposes the computer system to a known language such that the computer system, using the unique technique of the present invention, can produce the basis vectors used for later recognition of this known language. Using pattern recognition parlance, this is doing a "future selection". The technique of the present invention arranges these features in a sequence and uses them in a process called vector quantization which will be described herein.

The first pass of the embodiment of the present invention creates a first bank of information for each language. The first pass uses at least five speakers, each of which speak for at least five minutes. A better distribution may be obtained by using five male and five female speakers. However, the actual number of speakers and time of speaking can obviously be changed without changing the present invention.

The counter I is initialized in step 299. The data is entered into the system at step 300 where the A-D converter 108 digitizes the sounds every 16 ms (8 kHz). A 128 point butterfly Fast Fourier Transform (FFT) is done at step 302 after 128 samples are taken. This equivalently creates information which represents the energy in each of a plurality of frequency cells. The 128 point FFT results in sixty-four indications of energy, each indicating an energy in one spectral range. Each of these numbers is represented in the computer by a word, and each of the sixty-four words represent the energy in one of the cells. The cells are evenly spaced from 0 to 3800 hertz, and therefore are each separated by approximately 60 Hz. Therefore, the sixty-four numbers represent energy in 60 hertz cells over the spectral range extending from 0 to 3800 Hz.

The 128 point FFT gives us 64 numbers representing these 64 cells. Therefore, for instance, cell 1 covers from 0 through approximately 60 hertz (this should always be zero due to the bandpass filtering below 90 hertz). Cell 2 covers approximately 60 through approximately 120 hertz... Cell 64 covers approximately 3740 through 3840 hertz. Each of the cells is represented by two 8-bit bytes or one computer word. The 64 word array therefore represents a spectral analysis of the entered sound at a snapshot of time. The 64 computer words, taken as a whole, are called the SPECTRA vector. At any given time, this vector represents the energy distribution of the spoken sound.

Therefore, for each period of time, the process gives us 64 words of data. This data is then stored in an array called SPECTRA, which has 64 memory locations. Since this information is also obtained every period of time, the array in which it is stored must also have a second dimension for holding the information obtained at each period of time.

If the amount of memory available was unlimited, all of the data could simply be stored as it is obtained, in the array SPECTRA at location i (where i has been initialized to 1 at step 299) and be incremented at each 16×128 milliseconds to produce an array of data for later processing. However, for a five-minute processing sequence, this would produce i={(5 speakers) (5 min) (60 sec/min) (8000 samples/sec) (64 spectra/sample-speaker) (1 word/location-spectra)}/ (128 samples/location), which would require storage of about six million words of information (12 megabytes). While this is attainable, it would require expensive hardware. The preferred embodiment of the present invention processes the data as it is taken in to thereby minimize the amount of data storage which needs to be done. In order to do this, the present information must be compared with all previously stored information.

This is done by setting up a loop at step 304 from 1 to the current point (i-1). During the first pass, no comparisons are made. Therefore, the information is stored in the array SPECTRA at position I (here 1) at step 350. However, for all other passes besides the first pass, the loop set up at step 304 is executed.

First, at step 306, the contents of the array SPECTRA at position n is obtained. While step 306 shows the value (N,64), it should be understood that this is shorthand for SPECTRA (1,1-64), and is intended to denote the contents of the entire SPECTRA vector from position 1 through position 64. Once SPECTRA (N,64) is obtained, the current values are compared with this stored SPECTRA (N,64) using a dot product technique at step 308. This dot product technique will be described in detail later on. To summarize, however, the dot product produces an angle indicative of a vector difference between the vector formed by the current values and the vector formed by SPECTRA (N,64), which is from 0° to 90°. This embodiment considers the two vectors to be similar if the angle of difference is than 2.5°.

If the angle is less than 2.5°, as determined at step 310, the vectors are considered similar, and a weighted average is calculated at step 312. An array of weights is stored as WEIGHT (N) in which the number of values which have been weighted in the array SPECTRA at position n is maintained. This value WEIGHT (N) is obtained and stored in a first temporary position T1. The value of the array SPECTRA (N,64) at position N is multiplied by T1 (the number of values making up the weighted value) and maintained at a second temporary position T2. A third temporary position T3 gets the value of the weighted SPECTRA value, added to the current values, to produce a new weighted value in position T3. The value WEIGHT (N) is then incremented to indicate one additional value stored in SPECTRA (N,64), and the new weighted average value of SPECTRA (N,64) is stored in the proper position by dividing the value of T3 by the incremented weight.

A flag is also set to 0 indicating that the current value has been stored, and the loop is ended in any appropriate way, depending upon the programming language which is being used.

If the result at step 310 is no, (the angle is not less than 2.5°), the loop is incremented to the next N value at step 314. This is done until the last N value has been tested and therefore all of the values of SPECTRA array have been tested.

If the angle is greater than 2.5° for all values already stored at the end of the loop, this means that no previously stored value is sufficiently close to the current values to do a weighted average, and the current values therefore need to be stored as a new value. Therefore, step 350 is executed in which the current values are stored in the array SPECTRA (I,64) at position I. Step 354 sets WEIGHT (I) of the weight matrix to 1, indicating that one value is stored in position i of SPECTRA. The value i (the pointer) is then incremented at step 356, and control then passes to position A in FIG. 3. Position A returns to step 300 where another sound is digitized.

The loop is ended either by an external timer interrupt, or by the operator. A typical pass of information would be five minutes of information for five different speakers of each sex. This creates a set of features from the five speakers which indicates average spectral distributions of sound across these five people.

The concept of dot product is well known in the field of pattern recognition, but will be described herein for convenience. Each set of 64 values obtained from the FFT can be considered as a vector having magnitude and direction (in 64 dimensions). To multiply one vector by another vector, we obtain the following situation shown with reference to formula 1:

$$\bar{A} \cdot \bar{B}_{615} = |A| \cdot |B| \cos \Theta \tag{1}$$

where A and B are magnitudes of the vectors. The desired end result of the dot product is the value of the angle $\Theta$ which is the correlation angle between the two vectors. Conceptually, this angle indicates the similarity in directions between the two vectors.

In order to calculate the dot product of the two vectors including the 64 bits of information that we have for each, we must calculate the relation:

$$\vec{A} \cdot \vec{B} = \sum_{i=1}^{64} A(i) \cdot B(i) \quad (2)$$

$$|A| = \sqrt{S_A} \text{ where } S_A = \sum_{i=1}^{64} A(i) \cdot A(i)$$

$$|B| = \sqrt{S_B} \text{ where } S_B = \sum_{i=1}^{64} B(i) \cdot B(i)$$

Substituting between formula (1) and formula B allows us to solve for $\Theta$ as $$\Theta = \arccos \left[ \frac{\sum_{i=1}^{64} \vec{A}(i) \cdot \vec{B}(i)}{\sqrt{S_A} \cdot \sqrt{S_B}} \right] \quad (3)$$

Therefore, if the two vectors are identical, the value $\Theta$ is equal to 0° and cos $\Theta$ is equal to 1. If the two vectors are completely opposite, the opposite identity is established. The dot product technique takes advantage of the fact that there are two ways of computing the dot product using formulas Nos. 1 and 2. This enables comparison between the two vectors.

After pass 1 is completed, a number of basis vectors are obtained, and each one has a weight which indicates the number of the occurrences of that vector. The basis vectors created, along with the weights, are further processed in pass 2.

It is understood that pass 1 should be processed in real time, to minimize the amount of memory used. However, with an unlimited storage, both pass 1 and pass 2 could be performed as a single sample is taken. Alternately, with a sufficient amount of processor capability, both pass 1 and pass 2 could simultaneously be processed while the data is being obtained.

The pass 2 operation creates a histogram using information from the basis sets which have already been created in pass 1. This histogram represents the frequency of occurrence for each basis sound for each language or speaker. The key point of the present invention is that the histogram which is created, is an occurrence vector of each basis set among all basis sets for all languages to be recognized, and does not represent the basis sounds themselves. This will be described in detail with reference to FIG. 4 which represents the pass 2 technique.

What is obtained at the end of pass 1 is an average of the spectral content of all occurrences of the sounds which have been detected in the language, and the weight (number of times of occurrence) for each spectrum. Each spectrum represents one basis vector, and each basis vector has a weight dependent on its frequency of occurrence.

At the end of pass 1, we therefore have enough information to prepare a histogram between the different basis vectors in the language and the frequency of occurrence of each of these basis vectors. This would be sufficient to prepare a histogram which would enable the different languages to be recognized. However, pass 2 adds additional inter-language dependency to this technique which enables the recognition process to converge faster.

Pass 2 can be conceptually explained as follows. Each language, as discussed above, consists of a number of phonetic sounds which are common to the language. By determining the frequency of occurrence of these phonetic sounds, the language could be recognized. However different languages share common phonetic sounds.

To give an example, phonetic sound x may be common to English, French and German. It may even have a relatively high frequency of occurrence in all three languages. Phonetic sound y may also be common to English, French and German, but may have a high frequency of occurrence in the English language. In the other languages, phonetic sound y may have a low frequency of occurrence. Another problem with prior recognition systems is that some phonetic sounds are sub-vocalized, and therefore hard to recognize. The inventor of the present invention has recognized that the inter-language dependencies (that is, phonetic sounds which are common to multiple languages) enable ready recognition of the various languages. The inventor has also recognized that spectral distributions calculated at all times obviate the problem of difficulty of detecting sub-vocalized sounds.

Pass 2 calculates the histograms by using all the values determined in pass 1 for all languages, to add inter-language dependencies between the various languages.

Pass 2 begins at step 399 which sets the histogram to zero, followed by step 400, where the composite basis set CBASIS is created. Step 400 gets the x most common SPECTRA values (those with the highest weights) for each of y languages to be recognized and stores this in the CBASIS array. In this embodiment, the preferred value of x is 15. If, for example, there are ten languages to be recognized, this yields 150×64 entries in the array CBASIS.

Each of these 150 entries (x by y) represents a basis vector which has been found as having a high occurrence in one of the languages to be recognized. Each of these basis vectors which has a high frequency of occurrence in one language. By using each basis vector in each of the languages to be recognized, the inter-language dependencies of the various sounds (SPECTRA (64)) in each of the languages can be determined, not just those languages in which the values occur.

Step 402 begins the second pass in which new sounds from the language to be recognized are obtained. These sounds are digitized and fast Fourier transformed in the same way as steps 300 and 302 of FIG. 3.

The next step for each sound which is entered is to form the histogram for each known language. To do this, a for loop is set up between steps 404 and 406, which increments between 1 and (x*y) (which is all of the various basis vectors). Within this loop, each element of the composite vector array CBASIS is compared with the current SPECTRA which has been obtained at step 410. The comparison is actually a comparison measure using euclidian distance, comparing the incoming SPECTRA (64) with each vector in the composite basis set CBASIS (n,64). Step 412 determines if this distance is less than 20,000. This value has been empirically determined as sufficiently close to represent a "hit". If the value is less than 20,000, the value is compared against a previous lowest answer which has been previously stored. Those of ordinary skill in the art would understand that a very large "previous answer" is initially stored as an initial value. If the current answer is greater than the previous answer, flow passes to step 406 which increments the loop, without changing the current stored minimum. If the answer at step 412 is less than 20,000, and the answer at 414 is less than the previous answer, that means that this pass of the loop has received a lower answer than any previous pass of the loop. Accordingly, the current answer becomes the previous answer at step 416, and the current count of the closest match, which is kept in a temporary location T1 becomes N (the current loop count). The loop is then incremented again at step 406.

The temporary location T1 keeps the number of the lowest answer, and therefore the closest match. Accordingly, as long as any occurrences of the answer less than 20,000 have been determined at step 412, the histogram address of T1 is incremented at step 420.

Therefore, the histogram array or vector is successively incremented through its different values as the loop is executed. Each of the different values of the histogram represent one specific sound or SPECTRA, among the set of sounds or SPECTRA making up each of the most common spectral distributions of each of the known languages. The effect is to find an average distribution for the particular language. This average distribution also includes the effect of interlanguage dependency.

Pass 2 therefore provides us with a histogram in which each of a plurality of sounds or SPECTRA from each of the languages are plotted to show their number of occurrences. These reference histograms are used during the recognition phase, which will be described in detail with reference to FIG. 5.

Figure 5:
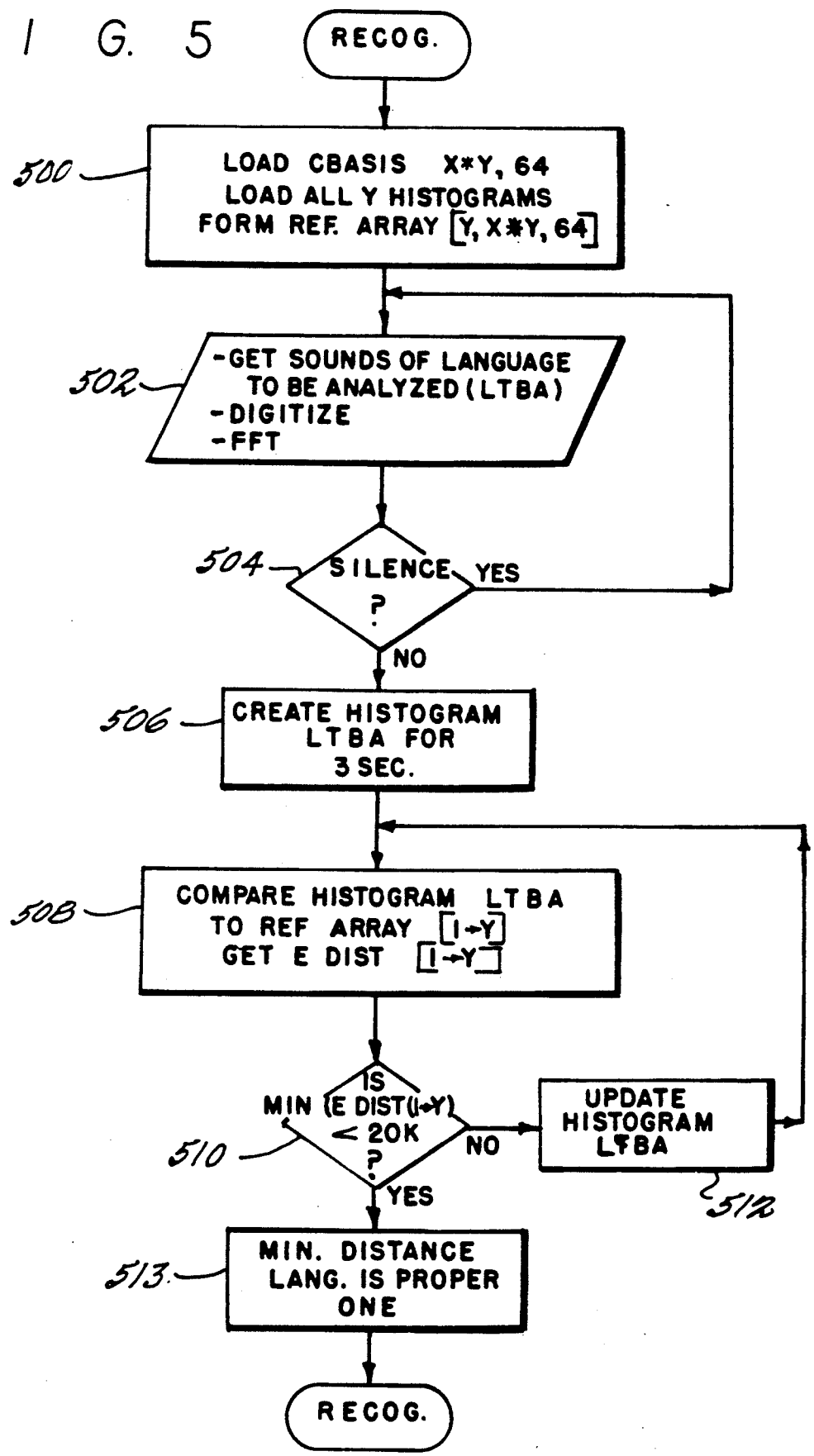
FIG. 5 shows the recognition phase of the present invention in which an unknown language to be determined is compared against the pre-stored references.

The FIG. 5 flowchart shows the steps used by the present invention to recognize one of the plurality of languages, and therefore is the one that is normally executed by the hardware assembly shown in FIG. 1. The learning modes will typically have been done prior to the final operation and are therefore are transparent to the user During the recognition mode, it is assumed that histograms for each of the languages of interest have therefore been previously produced.

The objective of the recognition mode is to find the histogram vector, among the set of known histogram vectors, which is closest to the histogram vector created for the unknown language. This is done by determining the euclidian distances with the known language histogram vectors. If the nearest euclidian distance is sufficiently close, this is assumed to be a match, and therefore indicates a recognition.

For purposes of explanation, the euclidian distance will now be described. So-called euclidian distance is the distance between two vector points in free space. Using the terminology that $$\vec{A} = A(64) \quad \vec{B} = B(64), \quad \text{then}$$

$$\text{E. Distance } (\vec{A} \cdot \vec{B}) = \sqrt{\sum_{i=1}^{64} [(A(i) \cdot B(i)]^2} \quad (5)$$

This is essentially the old $c^2 = a^2 + b^2$ from euclidian geometry, expanded into 64 dimensions to meet the 64 SPECTRA values. The numbers for Ai and Bi can vary from 0 to 16383 ($2^{14}$ for the 14 bit A-D). A distance match of 20,000 is empirically determined for these $2^{14}$ bits. It is understood that for different numbers of bits, those of the ordinary skill in the art could and would be expected to find different empirical values.

FIG. 5, showing the recognition phase, will now be explained.

Step 500 is the initial step of the recognition phase, and could equally well be a part of the preformed data. Step 500 first loads the composite basis array CBASIS where the array has xy elements: the x most common SPECTRA values for each of the y languages to be recognized. Step 500 also loads y histograms, and using the CBASIS array and the y histograms forms a reference array. This reference array has a correlation between each of the y histograms, each of the xy SPECTRA in each of the histograms, and the values of the xy SPECTRA.

Step 502 gets the sounds of the language to be analyzed and digitizes and FFTs these sounds, similar to the way this is done in steps 300 and 302 of FIG. 3. Step 504 compares the input sounds against silence. This is done according to the present invention by taking the sum of all of the SPECTRA cells, and adding these up. If all of these sounds add up to fourty or less, the SPECTRA is labeled as silence and is appropriately ignored. If the SPECTRA is determined not to be silence in step 504, a histogram for the language to be analyzed is created at step 506. This histogram is created in the same way as the histogram created in steps 404-420 of FIG. 4, using all of the spectral categories for all of the languages i to be analyzed. This histogram is created for 3 seconds in order to form an initial histogram.

Step 508 compares the histogram for the language to be analyzed to all elements of the reference array 1 through y where y is the number of languages being analyzed. This comparison yields a euclidian distance for each of the values 1 through y. Step 510 determines the minimum among these euclidian distances and determines if this minimum is less than 20,000. If the minimum distance is not less than 20,000, step 512 updates the histogram for the language to be analyzed, and returns control to step 508 to redo the test. At this point, we assume that the analysis has not "converged". However, if the result is positive at step 510, and the minimum distance is less than 20,000, then the minimum distance language is determined to be the proper one at step 513 thus ending the recognition phase.

Therefore, it can be said that if the computed distance of the unknown versus the reference is the minimum between all the references and less than a user-chosen limit (here empirically determined to be 20,000), then we can say the unknown language has been recognized to be this minimum.

Because of the inter-language dependencies which have been added into the histogram categories, the present invention enables a quicker determination of a proper language. Although a phonetic sound may be present in two or more languages, typically this phonetic sound will sound slightly different in different languages. By taking the SPECTRA distribution of this phonetic sound, and determining the minimum Euclidean distance, the closest possible fit is determined. Therefore, even if there are many similar sounds, the closest one will be chosen, thereby choosing the proper language even when the sounds are similar for different languages. This enables the recognition to converge faster.

An additional nuance of the system averages all the language histograms and creates a null language. This null language is loaded as one of the y histograms. Whenever the system recognizes this null language as being the closest match, this is determined as a rejection of the language.

Figure 4:
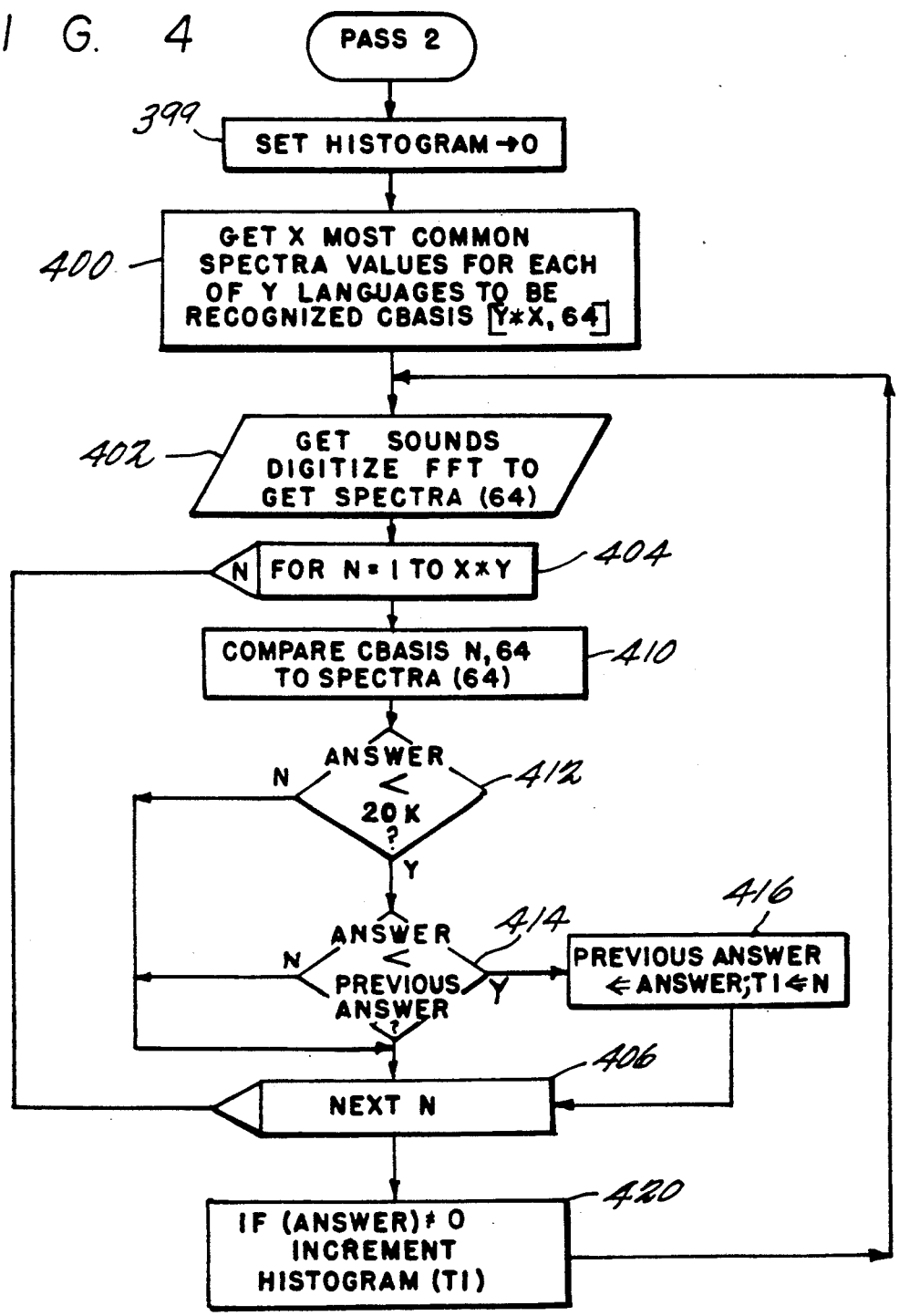
FIG. 4 shows a flowchart of the second pass of the learning operation of the present invention in which the histograms for each of a plurality of languages are formed.
Figure 6:
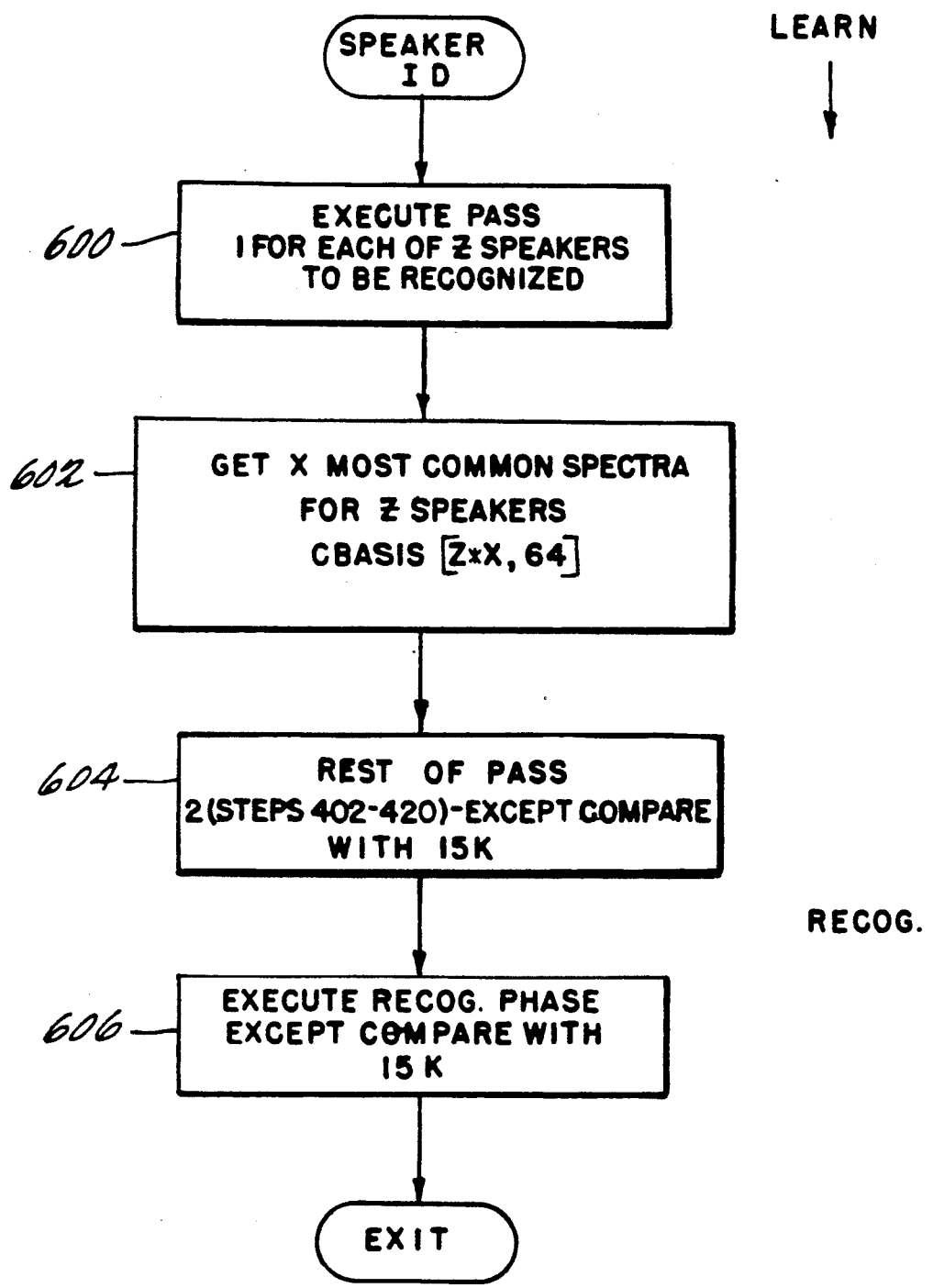
FIG. 6 shows a summary flowchart using the concepts of FIGS. 3-5 but applied to speaker identification.

A second embodiment of the invention operates similar to the first embodiment, but the aspect to be determined is optimized for speaker identification, as compared with language identification. Language identification identifies the language which is being spoken. Speaker identification identifies the specific speaker who is speaking the language. The techniques and concepts are much the same as the first embodiment. This second embodiment is shown in the flowchart of FIG. 6 in somewhat summary form. Step 600 executes pass 1 for each of the speakers to be recognized. Each speaker is executed for five minutes, or for some other user selectable amount of time. This creates a set of basis vectors for each of the z speakers to be recognized. The pass 2 system is executed at step 602 where the x most common SPECTRA values for each of the z speakers to be recognized is first determined to form CBASIS, or composite basis vector just as in pass 2 shown in FIG. 4. Step 604 then executes the rest of pass 2 (steps 402-420) with the only exception that step 412 in FIG. 4 is replaced with a comparison with 15,000 as the euclidian distance instead of the comparison with 20,000. This is because the match for speaker recognition is required to be closer than the necessary match for language recognition. At the end of step 604, the histograms for each of the speakers to be analyzed has been formed. Step 606 begins the recognize phase, and executes all elements of the recognize flowchart of FIG. 5 with the exception of step 510 in which the value to be compared with is 15,000.

The system is operated by use of a plurality of user friendly menus which enable the user to perform various functions. The main menu allows the user to choose between building new basis sets, looking at previously stored language histograms, or entering the recognized language's menu. Some sub-menus allow changing the rate of sampling, the number of points of FFT transformation, and the different ways in which the data is being distributed.

Figure 7A:
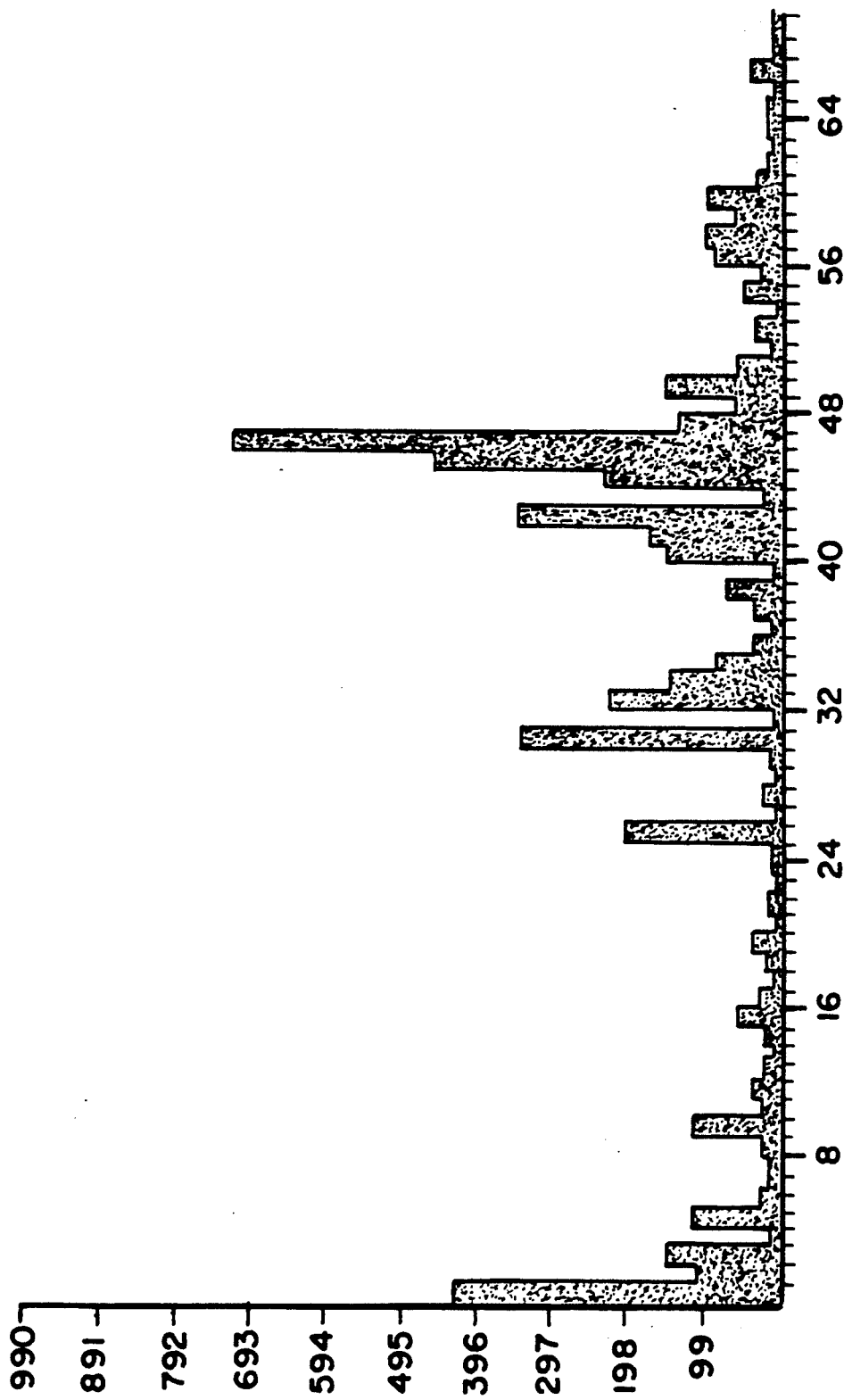
Figure 7C:
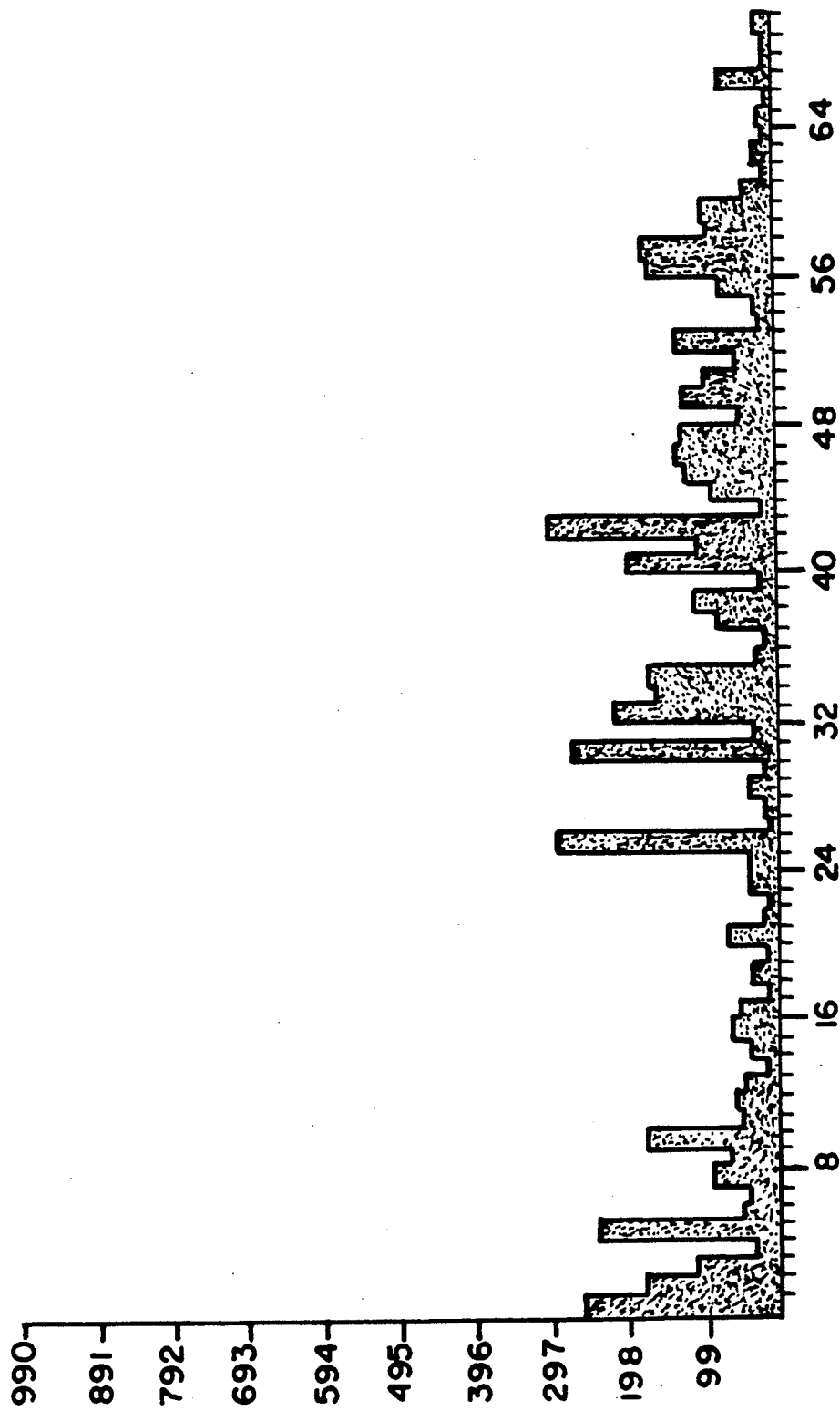

A sample set of reference histograms for English, Chinese, and Russian are shown in FIGS. 7A-7C. These histograms show the sound indicated by numbers on the x axis, and show the number of occurrences on the y axis. These examples use only approximately 68 different sounds as the possible sounds, but it is understood that many more than these are possible to be used.

Many modifications in the above program and technique are possible. For instance, as stated above, it would be quite feasible to operate the entire learning phase in a single pass, assuming that sufficient processing speed and power and sufficient memory were available. This would obviate the need for two different entries of data. Of course, the various empirical values which have been described herein could be modified by users. In addition, any number of languages could be used by this system, and limited only by the amount of available memory space.

In addition, other aspects of sound could be determined besides speaker identification and language identification including identification of dialects, possible area of origin of the speaker, and many other applications are possible. In addition, this technique could be used to identify a type of aircraft from its sound, or by converting a radar trace to sound, a radar signature could be identified. Of course, these examples are not limiting, and many other uses for the aspect recognition of the present invention.

All of these modifications are intended to be encompassed within the following claims.

What is claimed is:

1. A method for recognizing an aspect of speech, comprising the steps of:
    creating a plurality of histograms each having a plurality of elements, each element indicating a number of occurrences of a particular spectral distribution over a predetermined frequency range occurring within said speech, said plurality of histograms produced for each known aspects of speech respectively;
    receiving a segment of unknown speech to be recognized;
    creating a histogram having a plurality of elements, each element indicating a number of occurrences particular spectral distributions occurring within said unknown speech;
    determining differences between said histogram for said unknown speech and each of said histograms for said known aspects; and
    recognizing an aspect by determining which histogram of a known aspect is closest to said histogram for said unknown speech, the closest one indicating a recognition if the difference is less than a predetermined amount.

2. A method as in claim 1 wherein said creating histograms for each of a plurality of aspects to be recognized step includes the steps of:
    determining, for each instant of time, a spectral distribution of a speech sample;
    determining if said spectral distribution of said speech sample is similar to as previously obtained spectral storing said spectral distribution if it is not similar to a previously obtained spectral distribution;
    incrementing said number of occurrences of a particular spectral distribution if said spectral distribution is similar to said particular spectral distribution; and
    ordering said spectral distributions by said number of occurrences to from information indicative of an occurrence of each said spectral distributions which are obtained.

3. A method as in claim 2, wherein said ordering said spectral distributions step include the further step of creating a weighted average between said spectral distribution and said particular spectral distribution.

4. A method as in claim 1, comprising the further steps of:
    first determining spectral distributions for each of a plurality of samples of input sounds in which said aspect is known;
    determining most commonly occurring ones of said spectral distributions;
    creating a composite basis set, including only said most commonly occurring ones of said spectral distributions for all of said plurality of samples for said input sounds in which said aspect is known;
    second determining numbers of occurrences of spectral distributions included in said composite basis set of spectral distributions, for a second plurality of samples for which said aspect is known; and
    creating a relation of said numbers of occurrences of said spectral distributions included in said composite basis set for each of said second plurality of samples.

5. A method as in claim 4, wherein said first and second determining steps include the step of fast fourier transforming the input sample to obtain information indicative of a spectral content of said information.

6. A method as in claim 1, wherein said aspect is a language being spoken.

7. A method as in claim 1, wherein said aspect is a speaker who is speaking.

8. A method of creating a database from which an aspect of a sound can be identified, comprising the steps of:
first determining a plurality of spectral distributions, each said spectral distribution defining occurrences of sound components as a function of frequency over a predetermined frequency range, at predetermined time intervals, for each of a plurality of samples of input sounds in which said aspect is known;
second determining ones of said spectral distributions which occur most commonly as most commonly occurring ones of said spectral distributions;
creating a composite basis set, including only said most commonly occurring ones of said spectral distributions determined in said determining step for all of said samples;
third determining numbers of occurrences of spectral distributions included in said composite basis set of spectral distributions, for a plurality of samples for which said aspect is known; and
creating a relation of said numbers of occurrences of said spectral distributions included in said composite basis set for each of said plurality of samples.

9. A method as in claim 8, wherein said aspect is a language being spoken.

10. A method as in claim 8, wherein said aspect is a speaker who is speaking.

11. A method as in claim 8, wherein said first and second determining steps include the step of fast fourier transforming the input sample to obtain information indicative of a spectral content of said information.

12. A method as in claim 8, wherein said relation is a histogram.

13. A method as in claim 12 wherein said first determining step includes the steps of
comparing each incoming spectral distribution of said sample with stored spectral distributions to determine if said spectral distribution is similar to a previously obtained spectral distribution;
storing said spectral distribution if it is not similar to said previously obtained spectral distribution;
incrementing a number of occurrences of a particular spectral distribution if said spectral distribution is similar to said particular spectral distribution;
taking a weighted average between the incoming spectral distribution and the particular spectral distribution if said spectral distribution is similar to said particular spectral distribution; and
forming a basis set of said spectral distributions and said number of occurrences.

14. A method as in claim 13, wherein said comparing step takes a dot product between incoming spectral distributions and previously stored spectral distributions, and recognizes them to be similar if the result of the dot product is less than a predetermined amount.

15. A method as in claim 14, wherein said predetermined amount is 2.5 degrees.

16. A method as in claim 12, comprising the further steps of:
receiving a segment of unknown speech whose aspect is to be recognized;
creating a histogram indicating numbers of occurances of said spectral distributions included in said composite basis set in said segment of unknown determining differences between said histogram for said unknown speech and each of said histograms for said aspects to be recognized; and
recognizing an aspect by determining which histogram for a known aspect is closest to said histogram for an unknown aspect, the closest one indicating a recognition if the difference is less than a predetermined amount.

17. A method as in claim 8, wherein said third determining step including the steps of comparing each said sample to each element of said composite basis set to determine a minimum difference therebetween.

18. A method as in claim 17, wherein said second comparing is done by taking a euclidean distance.

19. A method of determining an aspect of a particular sound from a plurality of aspects, comprising the steps of:
first determining a plurality of spectral distributions, each of said spectral distributions defining occurrences of sound components as a function of frequency over a predetermined frequency range at predetermined time intervals for each of said plurality of aspects;
determining ones of said spectral distributions which occur most commonly in each of said plurality of aspects;
receiving an unknown sample in which said aspect is to be determined;
determining each spectral distribution over a predetermined frequency range within said sample at separated time intervals;
determining which of said most common spectral distributions is closest to each of said spectral distributions of said sample, and creating a histogram having elements each of which indicate a number of occurrences of said most common spectral distributions for said unknown sample respectively; and
comparing said histogram with prestored histograms for each of said plurality of aspects.

20. A method as claim 19, wherein said determining a number of most common spectral distributions step includes the step of creating a composite basis set including only each said most common spectral distributions in each of said plurality of aspects.

21. A method as in claim 19, comprising the further steps of:
first determining a plurality of spectral distributions of occurrences of sound components as a function of frequency over a predetermined frequency range at predetermined time intervals for each of a plurality of samples of input sounds in which said aspect is known;
determining said most commonly occurring ones of said spectral distributions;
creating a composite basis set, including only said most commonly occurring ones of said spectral distributions for all of said samples;
second determining numbers of occurrences of spectral distributions included in said composite basis set of spectral distributions, for a plurality of samples for which said aspect is known; and creating histograms of said numbers of occurrences of said spectral distributions included in said composite basis set for each of said plurality of samples, and using said histograms as said prestored histograms.

22. A method as in claim 21, wherein said aspect is a language being spoken.

23. A method as in claim 21, wherein said aspect is a speaker who is speaking.

24. A method as in claim 21, wherein said first determining step includes the steps of
comparing each incoming spectral distribution of said sample with stored spectral distributions to determine if said spectral distribution is similar to a previously obtained spectral distribution;
storing said spectral distribution if it is not similar to said previously obtained spectral distribution;
incrementing a number of occurrences of a particular spectral distribution if said spectral distribution is similar to said particular spectral distribution;
taking a weighted average between the incoming spectral distribution and the particular spectral distribution if said spectral distribution is similar to said particular spectral distribution; and
forming a basis set of said spectral distributions and said number of occurances.

25. A method as in claim 24, wherein said comparing step takes a dot product between incoming spectral distributions and previously stored spectral distributions, and recognizes them to be similar if the result of the dot product is less than a predetermined amount.

26. A method as in claim 19, wherein said determining which step determines a minimum euclidean distance.

27. A method of creating a database from which a particular aspect of a sound from a plurality of aspects can be identified, comparing the steps of:
first determining a plurality of spectral distributions, each spectral distribution defining occurrences of sound components as a function of frequency over a predetermined frequency range at predetermined time intervals for each of said plurality of aspects;
determining ones of said spectral distributions which occur most commonly in each of said plurality of aspects;
creating a composite basis set including only each said most common spectral distributions in each of said plurality of aspects;
analyzing each of a plurality of known aspects, to determine spectral distributions, and to determine numbers of occurrences of each of said spectral distributions of said composite basis set; and
creating histograms for each said aspect indicative of said occurrences of said elements in said composite basis set.

28. A method as in claim 27, comprising the further steps of:
receiving an unknown sample in which said aspect is to be determined;
determining spectral distributions of said sample;
determining which of said elements of said composite basis set is closest to said spectral distributions of said sample, and creating a histogram of frequency of occurrence of said most common spectral distribution for said unknown sample; and
comparing said table with said histogram for said aspects.

29. A method of determining an aspect of a particular sound from a plurality of aspects, comprising the steps of:
first determining a plurality of spectral distributions, each spectral distribution defining occurrences of sound components as a function of frequency over a predetermined frequency range at predetermined time intervals for each of a plurality of samples of input sounds in which said aspect is known;
comparing each incoming spectral distribution for each of said plurality of samples of input sounds in which said aspect is known with stored spectral distributions to determine if said incoming spectral distribution is similar to a previously obtained spectral distributions by taking a dot production between incoming spectral distributions and previously stored spectral distributions, and recognizing them to be similar if the result of the dot product is less than a predetermined amount;
storing said incoming spectral distribution if it is not similar to any of said previously obtained spectral distributions;
incrementing a number of occurrences of a particular spectral distribution if said incoming spectral distribution is similar to said particular spectral distribution;
taking a weighted average between the incoming spectral distribution and the particular spectral distribution if said incoming spectral distribution is similar to said particular spectral distribution;
forming a basis set of said spectral distributions and said number of occurrences;
determining most commonly occurring ones of said spectral distributions in said basis set;
creating a composite basis set, including only said most commonly occurring ones of said spectral distributions for all of said samples;
second determining numbers of occurrences of spectral distributions included in said composite basis set of spectral distributions, for a plurality of samples for which said aspect is known;
creating a plurality of histograms each having a plurality of elements, each element indicating said numbers of occurrences of said spectral distributions included in said composite basis set for each of said plurality of samples;
receiving an unknown sample in which said aspect is to be determined;
determining spectral distributions of said sample;
determining which of said most common spectral distributions in said composite basis set is closest to said spectral distributions of said sample, and creating a histogram of frequency of occurrence of said most common spectral distribution for said unknown sample; and
comparing said histogram with prestored histograms for each of said plurality of aspects by determining euclidean distance, and recognizing one of said plurality of aspects which has the minimum euclidean distance.

30. A method as in claim 29, wherein said aspect is a language being spoken.

31. A method as in claim 29, wherein said aspect is a speaker who is speaking.

32. An apparatus for recognizing an aspect of speech, comprising:
means for receiving a plurality of speech samples; and
first means, for:

a) creating a plurality of histograms each having a plurality of elements, each element indicating a number of occurrences of each of a plurality of spectral distributions of said speech samples, for each of a plurality of known aspects of speech, each said spectral distribution being a relation of occurrences of sound as a function of frequency over a predetermined frequency range at a predetermined time;

b) receiving a segment of unknown speech whose aspect is to be recognized from said receiving means;

c) creating a histogram having elements indicating numbers of occurrence of each of a plurality of said spectral distributions of said speech for said unknown speech; and d) determining differences between said histogram for said unknown speech and each of said histograms for said known aspects; and e) recognizing an aspect by determining which histogram for a known aspect is closest, the closest one indicating a recognition if the difference is less than a predetermined amount.

33. An apparatus as in claim 32 wherein said first means is also for:

f) determining, for each instant of time, a spectral distribution of a speech sample;

g) determining if said spectral distribution of said speech sample is similar to a previously obtained spectral distribution;

h) storing said spectral distribution if it is not similar to said previously obtained spectral distribution;

i) incrementing a number of occurrences of a particular spectral distribution if said spectral distribution is similar to said particular spectral distribution; and j) ordering said spectral distributions by said number of occurrences to form information indicative of an occurrence of each said spectral distributions which are obtained.

34. An apparatus as in claim 33, wherein said incrementing a number creates a weighted average between said spectral distribution and said particular spectral distribution.

35. An apparatus as in claim 32, wherein said processing means is also for:

f) first determining spectral distributions for each of a plurality of samples of input sounds in which said aspect is known;

g) determining most commonly occurring ones of said spectral distributions;

h) creating a composite basis set, including said most commonly occurring ones of said spectral distributions for all of said samples;

i) second determining numbers of occurrences of spectral distributions included in said composite basis set of spectral distributions, for a plurality of samples for which said aspect is known; and j) creating a relation of said numbers of occurrences of said spectral distributions included in said composite basis set for each of said plurality of samples.

36. An apparatus as in claim 32, wherein said aspect is a language being spoken.

37. An apparatus as in claim 32, wherein said aspect is a speaker who is speaking.

38. An apparatus as in claim 32, further comprising means for fast fourier transforming the input sample to obtain information indicative of a spectral content of said speech.

39. An apparatus for creating a database from which an aspect of a sound can be identified, comprising:

means for receiving input sounds;

means for fast fourier transforming said input sounds, for first determining spectral distributions for each of a plurality of samples of input sounds in which said aspect is known and second determining numbers of occurrences of spectral distributions for a plurality of samples for which said aspect is known, each said spectral distribution being a relation of occurrences of sound as a function of frequency over a predetermined frequency range at A predetermined time interval; and first means for:

a) determining most commonly occurring one of said spectral distributions determined by said fast fourier transform means;

b) creating a composite basis set, including said most commonly occurring ones of said spectral distributions for all of said samples; and c) creating a histogram between number of occurrences of said spectral distributions included in said composite basis set for each of said plurality of samples.

40. An apparatus as in claim 39, wherein said aspect is a language being spoken.

41. An apparatus as in claim 39, wherein said aspect is a speaker who is speaking.

42. An apparatus as in claim 39, wherein said first means is also for:

d) comparing each incoming spectral distribution of said sample with stored spectral distributions to determine if said spectral distribution is similar to a previously obtained spectral distribution;

e) storing said spectral distribution if it is not similar to said previously obtained spectral distribution;

f) incrementing a number of occurrences of a particular spectral distribution if said spectral distribution is similar to said particular spectral distribution;

g) taking a weighted average between the incoming spectral distribution and the particular spectral distribution if said spectral distribution is similar to said particular spectral distribution; and h) forming a basis set of said spectral distributions and said number of occurrences.

43. An apparatus as in claim 42, wherein said first means takes a dot product between incoming spectral distributions and previously stored spectral distributions, and recognizes them to be similar if the result of the dot product is less than a predetermined amount.

44. An apparatus as in claim 39, wherein said first means is also for:

d) receiving a segment of unknown speech whose aspect is to be recognized;

e) creating a histogram indicating numbers of occurrences of said spectral distributions included in said composite basis set;

f) determining differences between said histogram for said unknown speech and each of said histograms for said aspects to be recognized; and g) recognizing an aspect by determining which energy distribution diagram to a known aspect is closest, the closest one indicating a recognition if the difference is less than a predetermined amount.

45. An apparatus for determining an aspect of a particular sound from a plurality of aspects, comprising:

first determining a plurality of spectral distributions, each said spectral distribution defining occurrences of sound components as a function of frequency over a predetermined frequency range at predetermined time intervals, for each of a plurality of samples of input sounds in which said aspect is known;

means for determining which of said spectral distributions most commonly occur;

memory means for storing a number of said most common spectral distributions occurring in each of said plurality of aspects and storing histograms for each of said plurality of aspects as prestored histograms;

means for receiving an unknown sample in which said aspect is to be determined;

means for determining spectral distributions of said sample;

first means for
a) determining which of said most common spectral distributions is closest to each of said spectral distributions of said sample, and creating a histogram, each element of which indicates a frequency of occurrence of said most common spectral distributing for said unknown sample; and
b) comparing said histogram with said prestored histograms for each of said plurality of aspects and determining said aspect based on said comparison.

46. An apparatus as in claim 45, wherein said processing means is also for:
c) first determining spectral distributions for each of a plurality of samples of input sounds in which said aspect is known;
d) determining said most commonly occurring ones of said spectral distributions in said samples;
e) creating a composite basis set, including said most commonly occurring ones of said spectral distributions for all of said samples;
f) second determining numbers of occurrences of spectral distributions included in said composite basis set of spectral distributions, for a plurality of samples for which said aspect is known; and
g) creating histograms of said numbers of occurrences of said spectral distributions included in said composite basis set for each of said plurality of samples, and using said histograms as said prestored histograms.

47. An apparatus as in claim 46, wherein said aspect is a language being spoken.

48. An apparatus as in claim 46, wherein said aspect is a speaker who is speaking.

49. An apparatus as in claim 46, wherein said first means is also for:
h) comparing each incoming spectral distribution of said sample with stored spectral distributions to determine if said spectral distribution is similar to a previously obtained spectral distribution;
i) storing said spectral distribution if it is not similar to said previously obtained spectral distribution;
j) incrementing a number of occurrences of a particular spectral distribution if said spectral distribution is similar to said particular spectral distribution;
k) taking a weighted average between the incoming spectral distribution and the particular spectral distribution if said spectral distribution is similar to said particular spectral distribution; and l) forming a basis set of said spectral distributions and said number of occurrences.

50. An apparatus for determining an aspect of a particular sound from a plurality of aspects, comprising:
means for receiving a plurality of incoming signals;
means for A/D converting and FFTing said incoming signals to produce spectral distributions thereof, each said spectral distribution being a relation of occurrences of sound as a function of frequency over a predetermined frequency range at a predetermined time; and first means, for:
a) comparing each incoming spectral distribution for each of a plurality of samples of input sounds in which said aspect is known with stored spectral distributions to determine if said incoming spectral distribution is similar to a previously obtained spectral distribution by taking a dot product between incoming spectral distributions and previously stored spectral distributions, and recognizing them to be similar if the result of the dot product is less than a predetermined amount;
b) storing said incoming spectral distribution if it is not similar to any of said previously obtained spectral distributions;
c) incrementing a number of occurrences of a particular spectral distribution if said incoming spectral distribution is similar to said particular spectral distribution;
d) taking a weighted average between the incoming spectral distribution and the particular spectral distribution if said incoming spectral distribution is similar to said particular spectral distribution;
e) forming a basis set of said spectral distributions and said number of occurrences;
f) determining most commonly occurring ones of said spectral distributions in said basis set;
g) creating a composite basis set, including said most commonly occurring ones of said spectral distributions for all of said samples;
h) second determining number of occurrences of spectral distributions included in said composite basis set of spectral distributions, for a plurality of samples for which said aspect is known;
i) creating histograms of said number of occurrences of said spectral distributions included in said composite basis set for each of said plurality of samples:
j) receiving an unknown sample in which said aspect is to be determined;
determining spectral distributions of said unknown sample;
l) determining which of said most common spectral distributions in said composite basis set is closest to said spectral distributions of said sample, and creating a histogram frequency of occurrence of said most common spectral distribution for said unknown sample; and
m) comparing said histogram with prestored histograms for each of said plurality of aspects by determining euclidean distance, and recognizing one of said plurality of aspects which has the minimum euclidean distance.

51. An apparatus as in claim 50, wherein said aspect is a language being spoken.

52. A method as in claim 50, wherein said aspect is an aspect from the group of aspects consisting of a language which is being spoken, a speaker who is speaking, an aircraft, and a radar signature.

* * * * *